United States Patent
Moore (10) Patent No.: US 7,429,123 B2
(45) Date of Patent: Sep. 30, 2008

(54) PERSONAL ILLUMINATION AND SAFETY DEVICE

(75) Inventor: Jerry Moore, Boulder, CO (US)

(73) Assignee: Playhard, Inc., Boulder, CO (US)

( * ) Notice: Subject to any disclaimer, the term of this patent is extended or adjusted under 35 U.S.C. 154(b) by 170 days.

(21) Appl. No.: 10/565,051

(22) PCT Filed: Jul. 14, 2004

(86) PCT No.: PCT/US2004/022660

§ 371 (c)(1),
(2), (4) Date: May 11, 2006

(87) PCT Pub. No.: WO2005/008122

PCT Pub. Date: Jan. 27, 2005

(65) Prior Publication Data

US 2006/0256574 A1    Nov. 16, 2006

Related U.S. Application Data

(60) Provisional application No. 60/487,410, filed on Jul. 15, 2003.

(51) Int. Cl.
G02B 6/00 (2006.01)

(52) U.S. Cl. .............. 362/555; 362/551; 362/581
(58) Field of Classification Search ................ 362/103, 362/190, 191, 551, 552, 554, 555, 556, 558, 362/577, 580, 581, 800
See application file for complete search history.

(56) References Cited

U.S. PATENT DOCUMENTS

| | | | |
|---|---|---|---|
| 4,719,544 A * | 1/1988 | Smith | 362/800 |
| 4,924,362 A | 5/1990 | Janko et al. | |
| 5,128,843 A | 7/1992 | Guritz | |
| 5,477,424 A * | 12/1995 | Mocha | 362/555 |
| 5,738,432 A | 4/1998 | Okko et al. | |
| 5,842,766 A * | 12/1998 | Scharf, III | 362/554 |
| 5,879,076 A | 3/1999 | Cross | |
| 5,934,792 A | 8/1999 | Camarota | |
| 6,193,385 B1 | 2/2001 | Maki et al. | |
| 2004/0105278 A1* | 6/2004 | Currie et al. | 362/551 |
| 2004/0136205 A1* | 7/2004 | Peng et al. | 362/103 |

* cited by examiner

Primary Examiner—Y My Quach Lee
(74) Attorney, Agent, or Firm—Patton Boggs LLP (57) ABSTRACT

A personal illumination and safety device employs a flexible plastic rod to distribute the light of a light emitting diode (LED). A small container at one end of the flexible rod houses the LED, a battery and a switch which controls the illumination system. The flexible plastic rod allows the user to adapt the device to a variety of shapes and useful arrangements.

6 Claims, 7 Drawing Sheets

PERSONAL ILLUMINATION AND SAFETY DEVICE

CROSS-REFERENCE TO RELATED APPLICATIONS

This application is a Non-Provisional Application of U.S. Provisional (35 USC 119(e)) Application No. 60/487,410 filed on Jul. 15, 2003 and claims benefit thereto.

BACKGROUND OF THE INVENTION

1. Field of the Invention

The invention in general relates to an accessory device providing portable personal illumination.

2. Statement of the Problem

A number of inventors have attempted to develop or improve systems for illuminating individuals for the purpose safety, identification or entertainment in darkness or low light conditions. See, for example: U.S. Pat. No. 4,924,362 issued May 8, 1990 to Janko et al.; U.S. Pat. No. 5,128,843 issued Jul. 7, 1992 to Guritz; U.S. Pat. No. 5,738,432 issued Apr. 14, 1998 to Okko et al.; U.S. Pat. No. 5,879,076 issued Mar. 9, 1999 to Cross; U.S. Pat. No. 5,934,792 issued Aug. 10, 1999 to Camarota; and, U.S. Pat. No. 6,193,385 issued Feb. 27, 2001 to Maki et al.

One of the earliest systems was to use "glow-in-the-dark" materials integrated into clothing or other items of apparel. Although these items produce a glow at night, the phosphorescent material is ineffective during the twilight hours due to high ambient light level. In addition, the glow is not long lasting and such items require frequent and inconvenient "recharging" by exposure to a strong light source.

Other systems employ chemilucent liquids as a light source, but these require bulky compartments to house the liquid and the liquid itself is heavy. In addition, once the chemical reaction is initiated, the usable light output only lasts a few hours and the chemilucent material must be discarded and replenished after each use.

More recent illumination systems employ multiple LEDs arranged in serial strips or embedded directly in articles of attire. However, even with complex dimming, pulsing or other energy conserving circuitry, the use of multiple LEDs creates a relatively large drain on any battery and requires substantially larger batteries and/or their frequent replacement. The mass and volume required to house multiple LEDs, metallic wiring, complex control circuitry makes this method uncomfortable; and the numerous components and connections make the system vulnerable to damage.

Thus, there is a need for a personal illumination system that couples efficiency and economy with light weight, flexibility and durability to create a comfortable, efficient, adaptable and reliable personal illumination system.

SUMMARY OF INVENTION

The present invention represents an apparatus that satisfies the above needs by providing an illumination device comprising a flexible rod having an elongated length dimension terminated by a first end and a second end, the rod made of a material having sufficient clarity and being sufficiently dispersive of light such that light entering one of the ends is transmitted along the elongated length dimension and radiates from the rod in substantially all directions along a substantial portion of the length of the rod. One end of the rod is embedded in a light emitting diode (LED). Preferably the rod is made of a thermoplastic material.

The invention also provides a lightweight but rugged mechanism for switching the illumination device on and off. The switching mechanism incorporates the leads of the LED into the switch.

The invention also provides a lightweight but rugged mechanism for attaching the illumination device to a person or an object. The flexible rod itself is incorporated into the attachment mechanism. In addition, in the preferred embodiment, a housing for the switching mechanism forms another part of the attachment mechanism.

The invention provides an illumination apparatus for illuminating a person or object, the illumination apparatus comprising: a light emitting diode having a dielectric casing; a solid, flexible rod having an elongated length dimension terminated by a first end and a second end, the material having sufficient clarity and being sufficiently dispersive of light such that light entering one of the ends is transmitted along the elongated length dimension and radiates from the rod in substantially all directions along a substantial portion of the length of the rod; the first end of the rod embedded in the dielectric casing; and an attachment mechanism connected to the rod for stably connecting the rod to the person or object. Preferably, the rod is made of a thermoplastic material. Preferably, the first end of the flexible rod is enclosed within an electronics container housing the light emitting diode, a battery and switch. Preferably, the attaching mechanism is incorporated into the container. Preferably, the apparatus further g an end cap capping one end of the flexible rod. Preferably, the container includes a anchoring mechanism for anchoring the second end of the flexible rod to form a loop. Preferably, the anchoring mechanism comprises an end cap capping the second end and a slot in the container large enough to receive the rod but too small to pass the end cap.

The invention also provides a method of illuminating an object, the method comprising: providing an illumination device including: a solid, flexible rod of thermoplastic material having an elongated length dimension terminated by a first end and a second end, the material having sufficient clarity and being sufficiently dispersive of light such that light entering one of the ends is transmitted along the elongated length dimension and radiates from the rod in substantially all directions along a substantial portion of the length of the rod; and a light emitting diode located to illuminate the first end of the flexible rod; and looping the flexible rod about the object. Preferably, the method further includes adjusting the size of the loop.

In another aspect, the invention provides an illumination apparatus comprising: a flexible, light transmitting rod having a first end; and a light source located to illuminate the first end of the rod, the light source comprising: a light emitting diode (LED) comprising a semiconductor chip embedded in a dielectric casing, and a pair of electrical leads attached to the semiconductor chip; and a battery; wherein the electrical leads directly contact the battery. Preferably, the illumination apparatus further comprises an electronics container for containing the light source, the container having a base and a cap for covering the base; and a cam element located to press one of the electrical leads into electrical contact with the battery when the cap is rotated with respect to the base.

The invention further provides a method for switching an illumination apparatus including a flexible, light transmitting rod having a first end, and a light source located to illuminate the first end, the method comprising: providing a base element and a cover enclosing the light source; and rotating the cap with respect to the base element to switch the illumination on or off.

DESCRIPTION OF THE PREFERRED EMBODIMENT OF THE INVENTION

Figure 1:
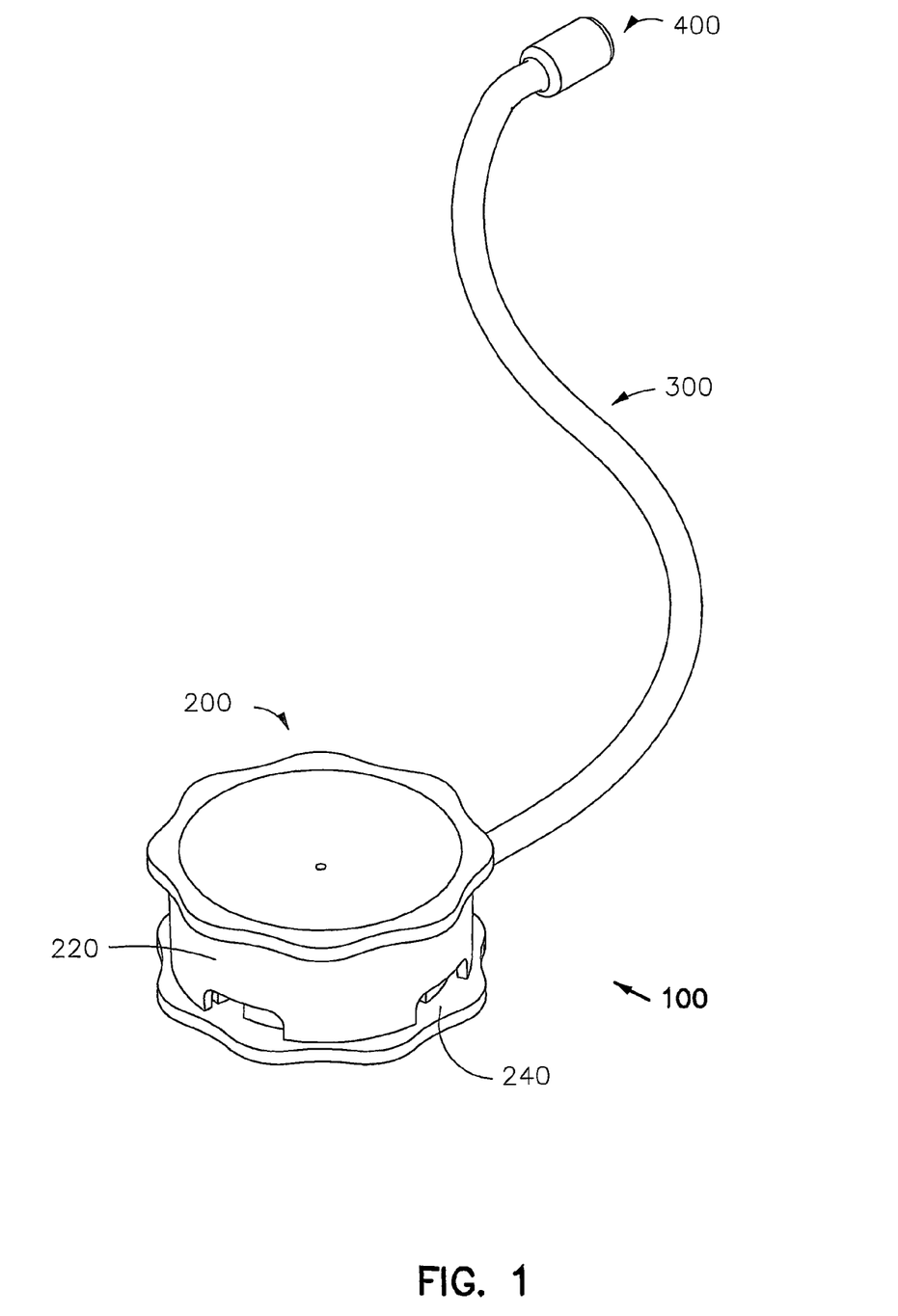
FIG. 1 shows a perspective view of the preferred embodiment of a personal illumination device according to the invention.

FIG. 1 is a perspective view of personal illumination device 100 according to the invention. Personal illumination device 100 preferably includes electronics container 200, solid, flexible rod 300 and endcap 400. Container 200 includes cap 220 and base 240. Rod 300 is elongated essentially in the vertical direction in FIG. 1, and is made of a material having sufficient clarity and being sufficiently dispersive of light such that light entering one of its ends is transmitted along the elongated length dimension and radiates from the rod in substantially all directions along a substantial portion of the length of the rod.

Figure 2:
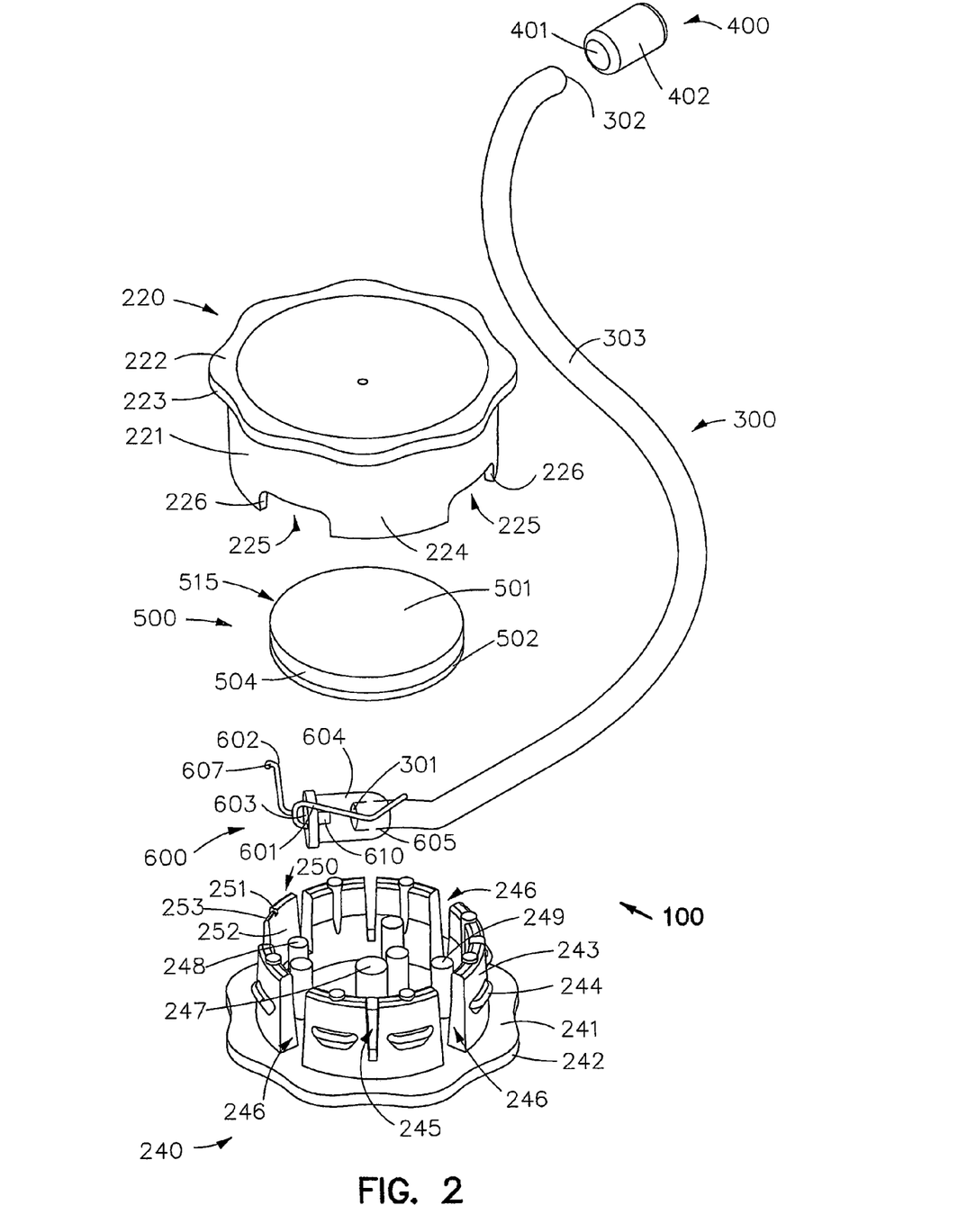
FIG. 2 shows an exploded perspective view of the personal illumination device of FIG. 1.

FIG. 2 is an exploded perspective view of personal illumination device 100 showing battery 500 and light emitting diode 600 housed within base 240 and covered by cap 220 of container 200. Flexible rod 300 comprises a first or input end 301, a second or output end 302 and radiating surface 303. Light emitting diode 600 comprises cathode lead 601, anode lead 602 which is bent near its terminal end to form keeper 607, lead base 603, semiconductor chip 610, and dielectric casing 604 with cylindrical recess 605. Battery 500 comprises positive contact surface 501 and negative contact surface 502. LED 600 and battery 500 comprise a light source 515. Endcap 400 comprises cylindrical body 402 with cylindrical recess 401. Cap 220 comprises cylindrical body 221, overhanging lip 222 with scalloped edge 223, bottom edge 224 with three notches 225, and opposing faces 226 of notches 225. Base 240 comprises bottom 241 with scalloped edge 242, a plurality of base segments 243 with snap tabs 244, a plurality of clamp slots 245, a plurality of rod slots 246, lead support post 247, alignment post 248, a plurality of battery support posts 249, and switch lever 250 with lead notch 251, inner surface 252, and cam surface 253.

In this embodiment, input end 302 of flexible rod 300 is adhesively affixed or welded into cylindrical recess 605 of light emitting diode 600. Output end 301 of flexible rod 300 is adhesively affixed or welded into cylindrical recess 402 of endcap 400. Dielectric casing 604 of light emitting diode 600 is adhesively affixed to bottom 241 of base 240 with lead base 603 of light emitting diode 600 abutting alignment post 248 and flexible rod 300 disposed in rod slot 246 between base segments 243. Anode lead 602 of light emitting diode 600 abuts inner surface 252 of switch lever 250 with keeper 607 in lead notch 251. Cathode lead 601 of light emitting diode 600 is oriented to align over lead support post 247. Battery 500 fits over light emitting diode 600 with negative contact surface 502 in electrical contact with cathode lead 601 of light emitting diode 600 as it passes over lead support post 247. Battery 500 is further supported by battery support posts 249 and firmly held in place at its perimeter 504 by base segments 243. Switch lever 250 and lead notch 251 are positioned so that, when switch lever 250 is in its unbiased or OFF position, anode lead 602 of light emitting diode is not in contact with positive contact surface 501 of battery 500. Cap 220 fits over base segments 243 and is held in place by mating contact of snap tabs 244 with snap groove 229 of cap 220 (see FIG. 3).

Flexible rod 300 comprises construction material that is preferably optically transparent and flexible enough to easily conform its curvature to shapes determined by the user, an example of which is 3 mm diameter clear polyurethane extruded rod by Freelin-Wade, Inc. Cap 220 and base 240 of container 200 comprise construction material that is optically translucent to allow indirect transmission of spill over light from light emitting diode 600 and rigid enough to securely snap together and house light emitting diode 600 and battery 500. Endcap 400 comprises construction material that is optically translucent and rigid. An example of such construction material for container 200 and endcap 400 is high density polyethylene with its "natural" coloration. Battery 500 is preferably a single coin sized battery or a series stack of a plurality of batteries of sufficient voltage and amperage to drive light emitting diode 600, an example of which is a 3v lithium coin cell, Model CR2032 by Renanta USA, Inc. Light emitting diode 600 is preferably any two lead single or multi-color light emitting diode, an example of which is a "Precision Optical Performance AlInGaP Lamp" by Agilent, Inc.

Operation of personal illumination device 100 occurs as follows: while holding scalloped edge 242 of base 240 the user grasps scalloped edge 223 of cap 220 and rotates cap 200 relative to base 240. This rotation brings switch cam 227 of cap 220 (see FIG. 3) in contact with cam surface 253 of switch lever 250 (the "ON" position) and moves anode lead 602 of light emitting diode 600 into electrical contact with positive contact surface 501 of battery 500. This results in a closed electrical circuit between light emitting diode 600 and battery 500 and light emitting diode 600 illuminates input end 301 of flexible rod 300. Flexible rod 300 transmits this light along its length, but a portion of the light radiates through surface 303. Light which does radiate through surface 303 exits flexible rod 300 through output end 302 thus illuminating body 401 of endcap 400. Reversal of the rotation of cap 200 relative to base 240 moves switch cam 227 away from switch lever 250 (the "OFF" position) and the spring action of switch lever 250 pulls anode lead 602 out of contact with positive contact surface 501 of battery 500 thus breaking the electrical circuit and extinguishing light emitting diode 600. Notches 225 in bottom edge 224 of cap 220 are elongated to allow for rotational movement of cap 220 from the "ON" position to the "OFF" position without interfering with flexible rod 300 as it passes through rod slot 246 of base 240. In addition the opposing faces 226 of notches 225 act as rotational stops when, during rotation, they contact surface 303 of flexible rod 300.

Figure 3:
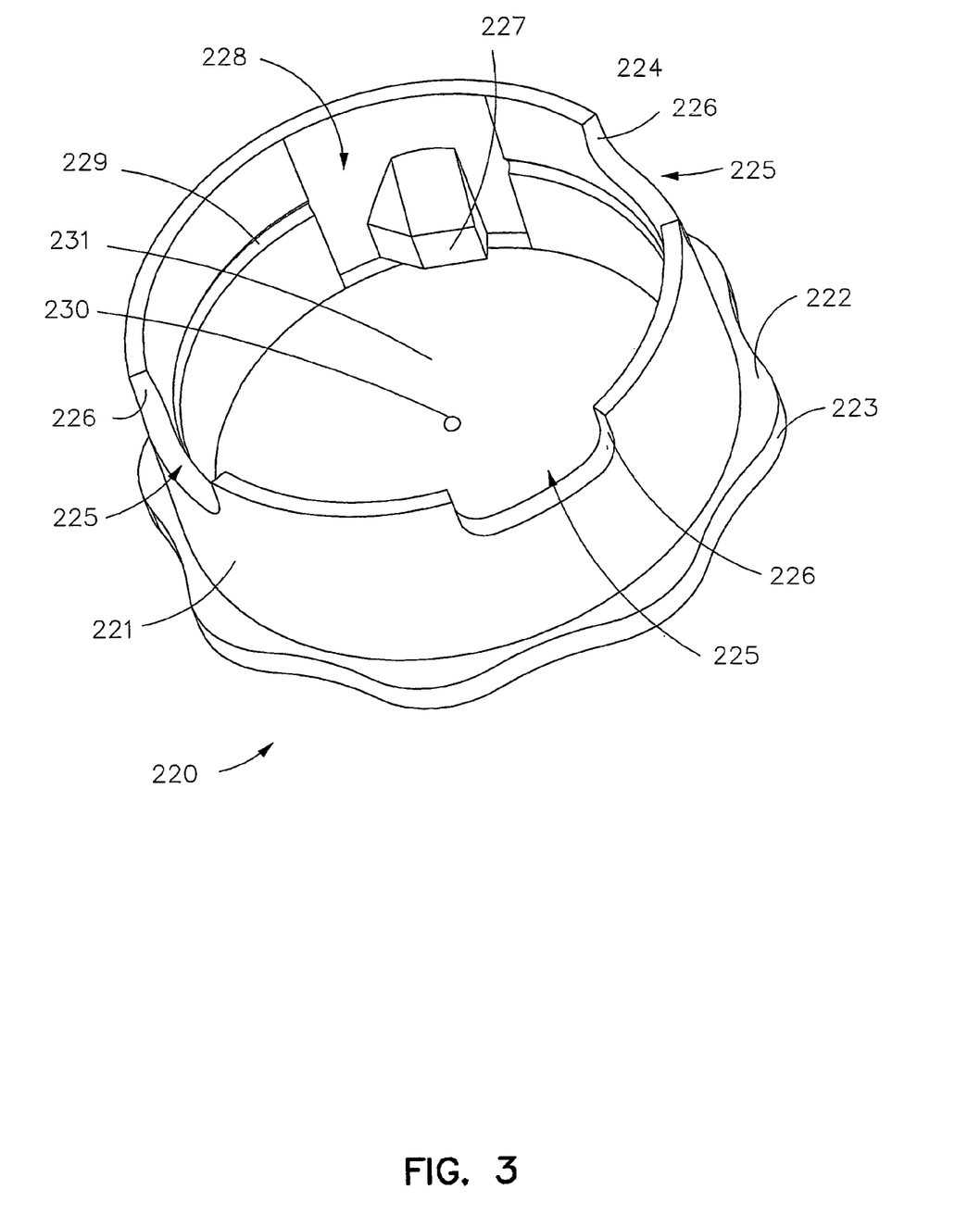
FIG. 3 is a perspective view of the underside of the container cap according to the invention.

FIG. 3 is a perspective view of the underside of cap 220 additionally illustrating switch cam 227, switch space 228, snap groove 229, bumper 230, and pressure cone 231. Switch space 228 of cap 220 opposes cam surface 253 of switch lever 250 on base 240 when personal illumination device 100 is in the "OFF" position. Switch cam 227 of cap 220 opposes cam surface 253 of switch lever 250 on base 240 when personal illumination device 100 is in the "ON" position. Snap groove 229 of cap 220 mates with snap tabs 244 of base segments 243 on base 240 to hold cap firmly to base. With cap 220 snapped in place bumper 230 and pressure cone 231 of cap 220 act in combination to apply pressure to battery 500 to maintain continuous electrical contact between cathode lead 601 of light emitting diode 600 and negative contact surface 502 of battery 500.

Figure 4:
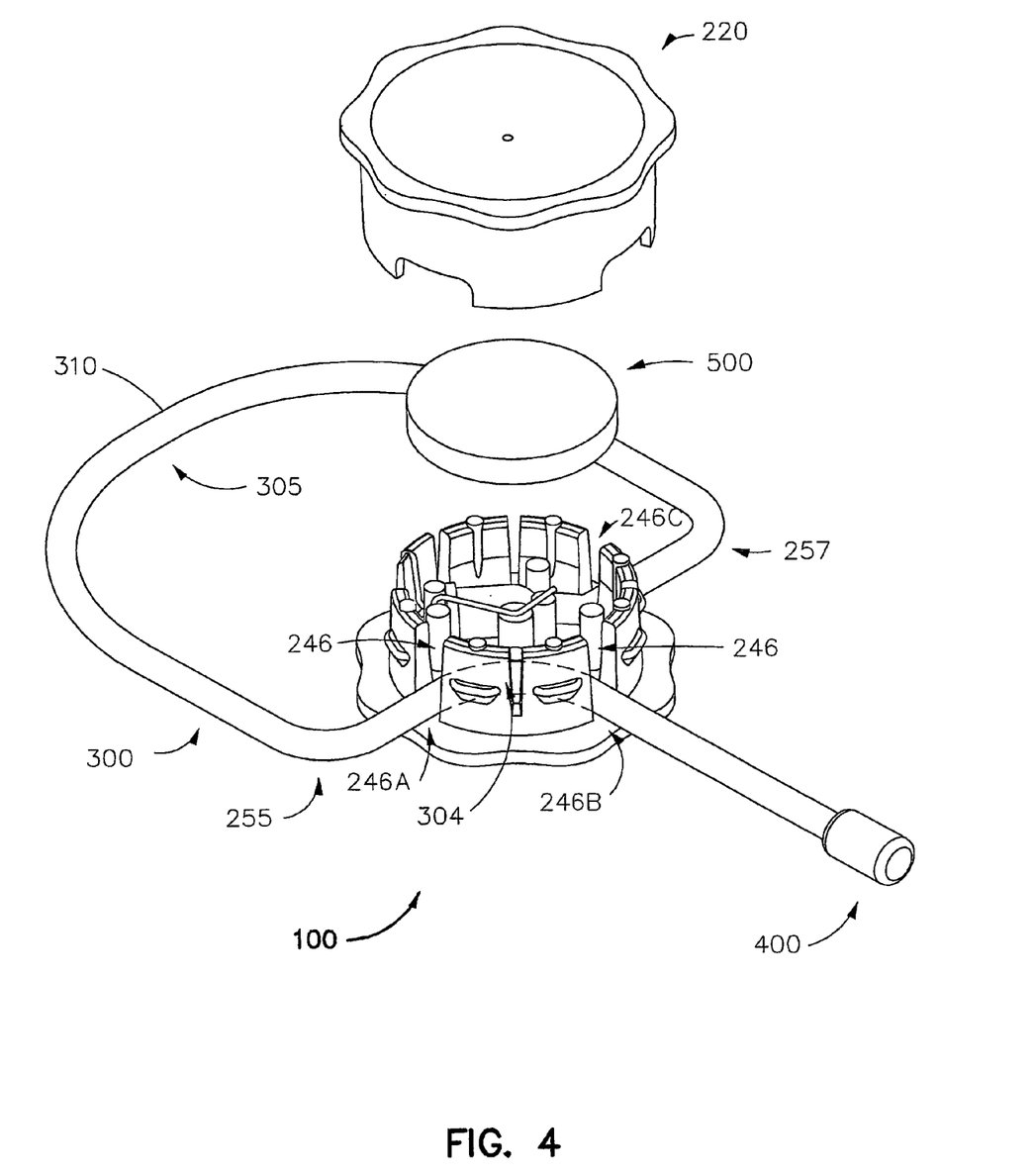
FIG. 4 is an exploded perspective view of the personal illumination device of FIG. 1 as configured in an adjustable loop.

FIG. 4 is an exploded perspective view of personal illumination device 100 configured with flexible rod 300 forming adjustable loop 305 as it is routed back through base 240 using two rod slots 246. Slots 246A and 246B form a mechanism 255 for anchoring rod 300 to form a loop 310. Slots 246A, 246B and 246C, together with rod 300, form a mechanism of attaching the rod to a person or object. Bend 304 forms in flexible rod 300 as it passes around base segments 243. In this configuration, the size of loop 305 can be easily adjusted. Bend 304 acts as a friction tightener to keep tension loop 305.

Figure 5:
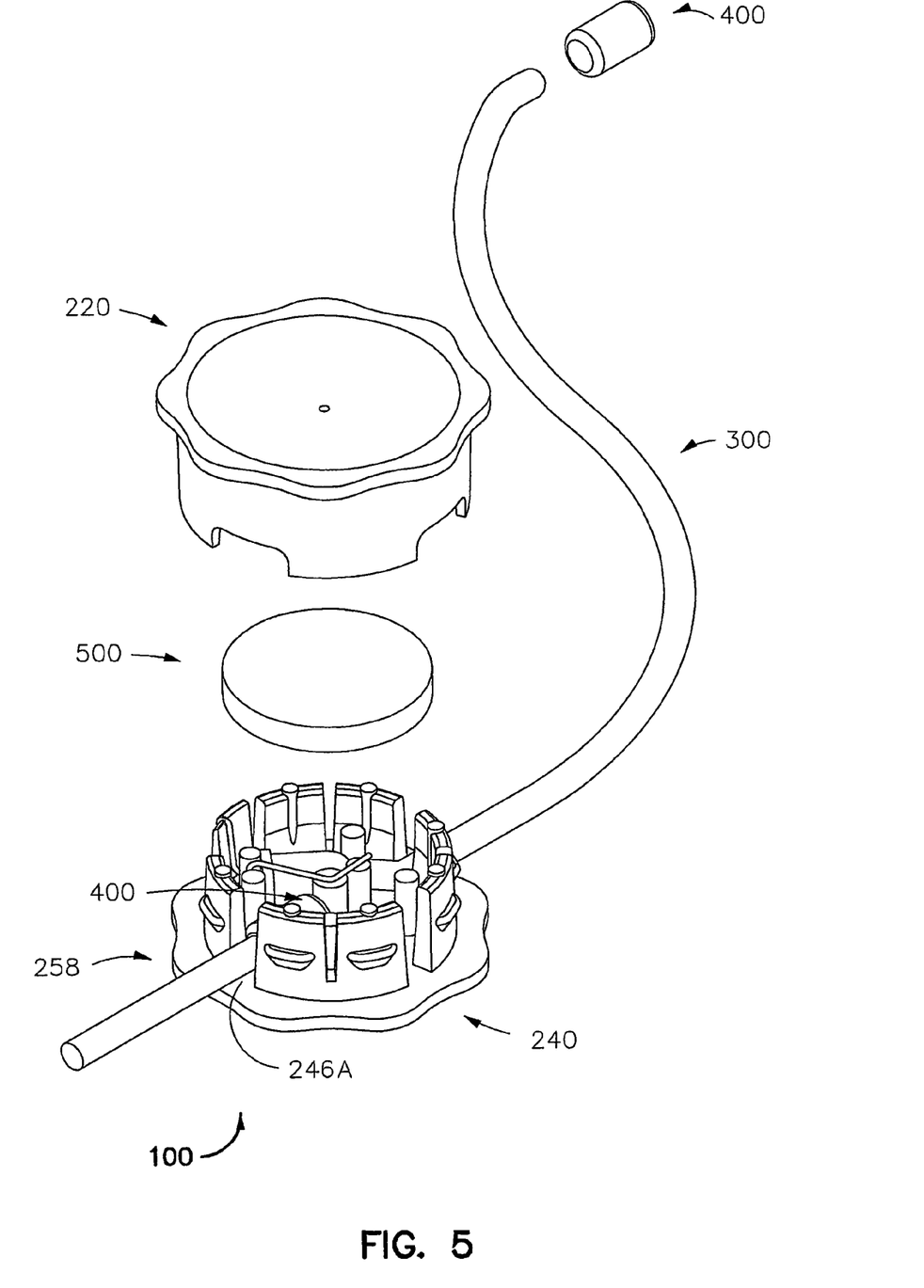
FIG. 5 is an exploded perspective view of personal illumination device of FIG. 1 as configured in a fixed loop.

FIG. 5 is an exploded perspective view of personal illumination device 100 configured with endcap 400 trapped inside base 240 thus forming either a fixed closed loop, if employing a single personal illumination device 100, or a connection between multiple personal illumination devices 100. Slot 246A and end cap 400 form an attachment mechanism 258 to attach the illumination device 100 to a person or object.

Figure 6A:
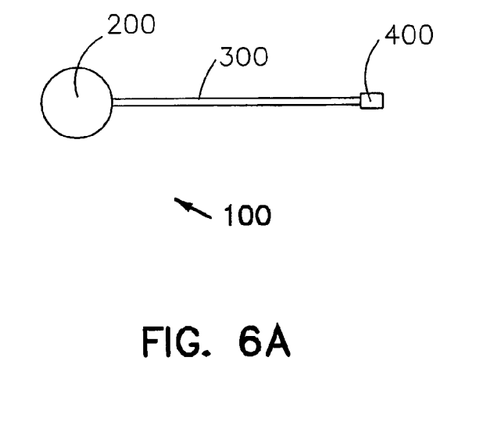
FIGS. 6A through 6F illustrate various schematic configurations of the preferred embodiment according to the invention.

FIG. 6A is a schematic illustration of a single unlooped personal illumination device 100.

Figure 6B:
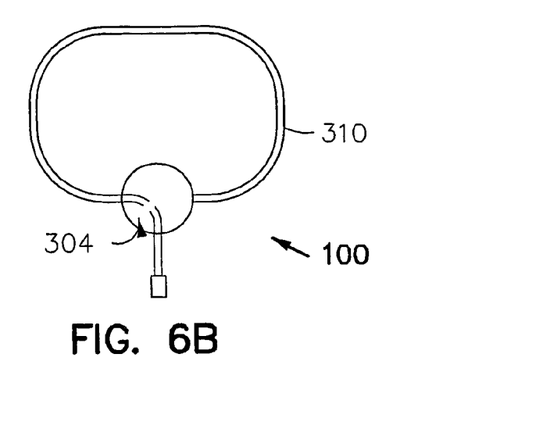

FIG. 6B is a schematic illustration of a single personal illumination device 100 configured with an adjustable loop 310 (see also FIG. 3).

Figure 6C:
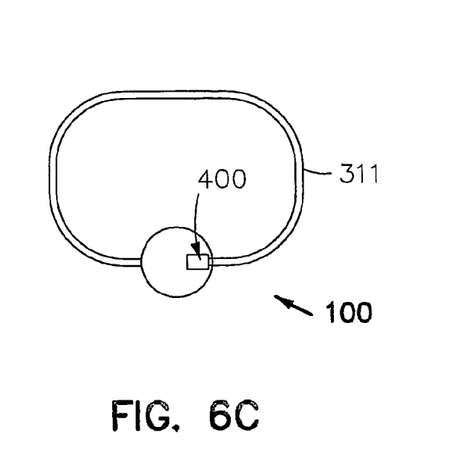
Figure 6D:
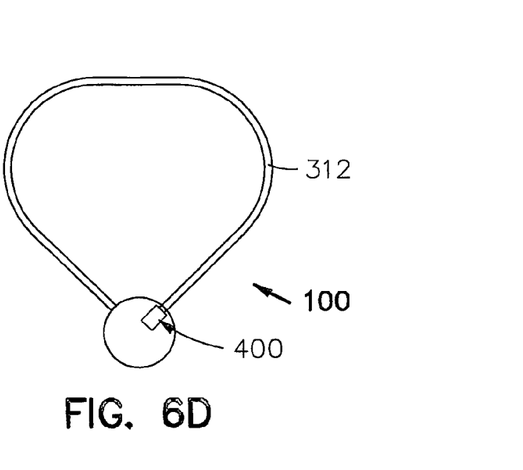

FIG. 6C is a schematic illustration of a single personal illumination device 100 configured with a "belt" style fixed loop 311. FIG. 6D is a schematic illustration of a single personal illumination device 100 configured with a "pendant" style fixed loop 312.

Figure 6E:
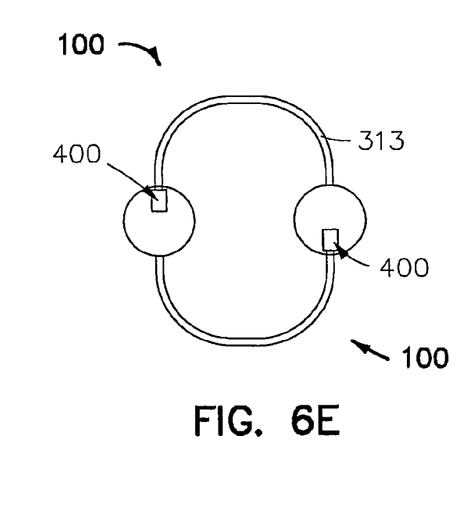

FIG. 6E is a schematic illustration of two personal illumination devices 100 connected together in a fixed loop 313.

Figure 6F:
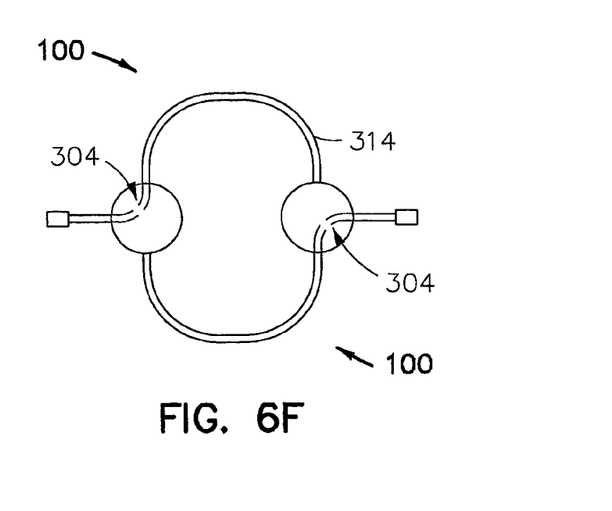

FIG. 6F is a schematic illustration of two personal illumination devices 100 connected together in an adjustable loop 314.

Figure 7A:
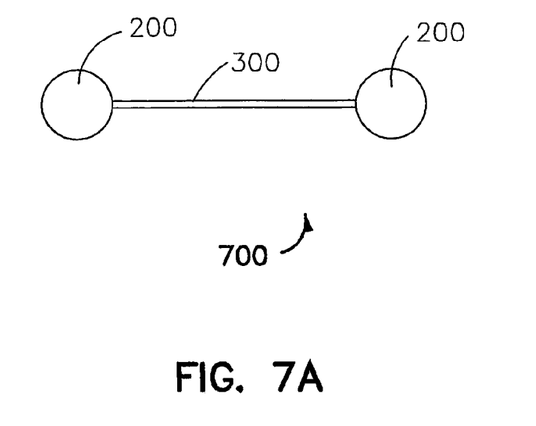
FIGS. 7A through 7C illustrate various schematic configurations of alternate embodiments of a personal illumination device according to the invention.

FIG. 7A is a schematic illustration of an alternative embodiment 700 of the invention featuring a single flexible rod 300 with a container 200 at both ends. This embodiment could be used to extend the illuminated length of flexible rod 300. It could also be employed to provide a choice of two different colored light sources in the same device for use in team play (i.e. "red" team and "blue" team).

Figure 7B:
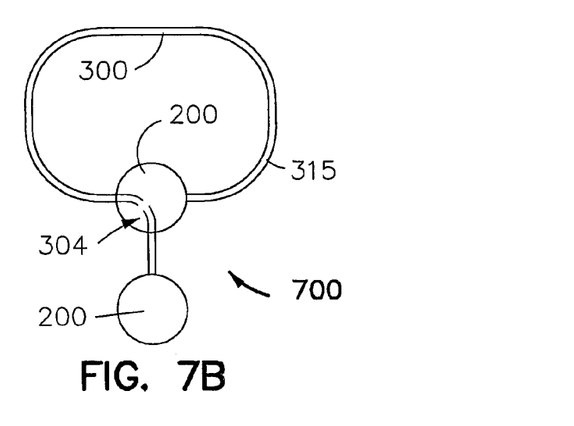

FIG. 7B is a schematic illustration of alternative embodiment 700 configured with an adjustable loop 315.

Figure 7C:
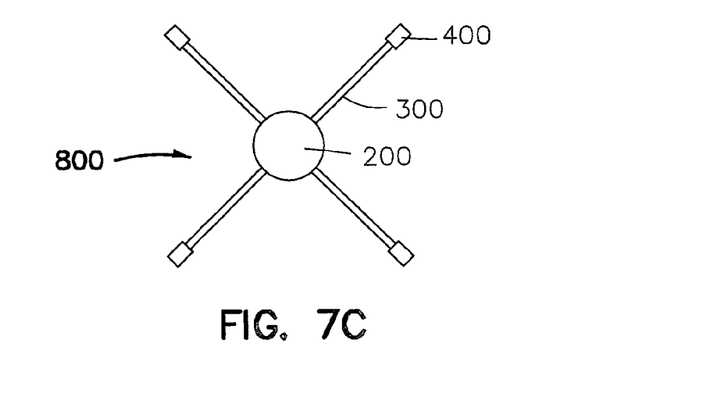

FIG. 7C is a schematic illustration of an alternative embodiment 800 of the invention featuring a single container 200 coupled with multiple flexible rods 300 and endcaps 400. This configuration and variations of it could be used as connecting nodes for multiple chains of devices.

Figure 7D:
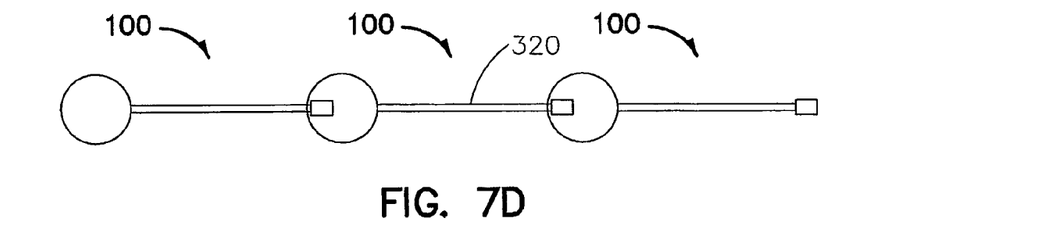
FIGS. 7D & 7E illustrate various embodiments of the invention which utilize multiple personal illumination devices according to the invention.

FIG. 7D is a schematic illustration of multiple personal illumination devices 100 connected together in a fixed chain 320.

Figure 7E:
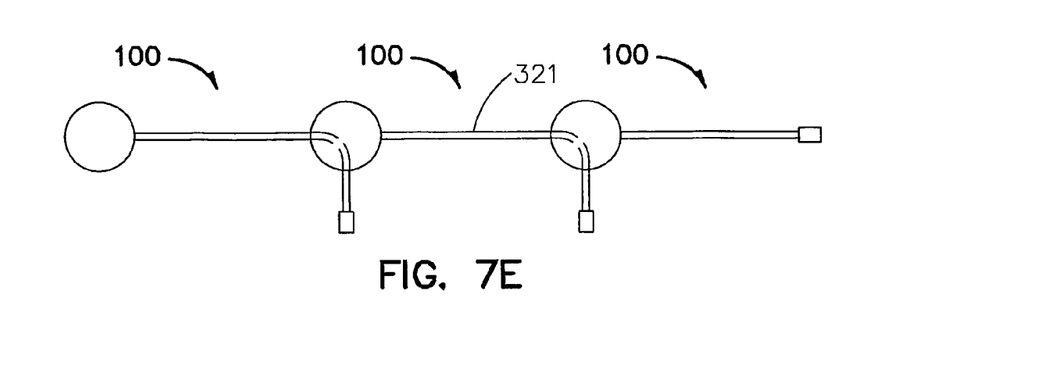

FIG. 7E is a schematic illustration of multiple personal illumination devices 100 connected together in an adjustable chain 321.

A novel feature of the personal illumination device 100 is that the plurality of base segments 243 have a degree of flexibility that permits the them to cooperate independently with the battery 500 and the cap 220. The independent and flexible nature of the base segments 243 enables a tight fit between the base 240 and the cap 220. Also because base segments 243 are independent, they grip battery 500 better and keep it centered, so that battery can't slide around, which makes the entire container 200 a more rigid structure. That is, the battery 500 is a structural component of the container 200, thereby adding additional strength to the container 200. In addition, as the cap 220 is being placed over the plurality of base segments 243, the snap groove 229 engages the snap tab 244 of each individual base segment 243 to create a tight secure fastening mechanism. When the cap 220 is placed on the base segments 243, the base segments 243 and cap 220 grip the battery forming a rigid housing that protects the personal illumination device electronics.

Another feature of the invention is that cathode lead 601 and anode lead 602 directly contact the battery 500. Herein, the term "leads" are limited only to the conductors imbedded in dielectric casing 604 of light emitting diode 600 and do not mean other conductors that may be connected to these conductors. Herein, the term "directly contact" means that the leads physically touch battery 500, and does not include situations where significant other conductors are placed in between the leads and the battery.

Other embodiments of the invention may additionally include some or all of the following features: placement of container 200 at both ends of the flexible rod to provide more uniform illumination of longer flexible rods 300, or to provide for a second color light emitting diode 600 (see FIGS. 7A & 7B); combination of multiple flexible rods 300 and endcaps 400 with a single container 200 (see FIG. 7C); molding flexible rod 300 as an integral part of container 200; molding endcap 400 as an integral part of flexible rod 300; and, replacing endcap 400 with a clip, buckle or other attachment mechanism.

In its various configurations, the invention provides an lightweight, economical and adaptable device that can be effectively used for nighttime personal illumination, safety or entertainment, some examples of which include, but are not limited to, the following: as a headband, armband, belt, legband or necklace to identify pedestrians, bicyclists, or team sports players; as a marker for hazardous objects, barriers or directional signage; as a recreational toy for twirling or aerial play; or, as a pet collar or pet leash.

The invention has been described in language more or less specific as to methodical features. The invention is not, however, limited to the specific features described, since the device and methods herein disclosed comprise preferred forms of putting the invention into effect.

There has been described a novel personal illumination device 100 for the purpose of personal safety and recreation, a novel method of lighting personal illumination device 100, and methods of switching the electronic light source on personal illumination device 100. While the invention has been described in terms of specific embodiments, it should be understood that the particular embodiments shown in the drawings and described within this specification are for purposes of example and should not be construed to limit the invention which will be described in the claims below. Further, it is evident that those skilled in the art may now make numerous uses and modifications of the specific embodiments described, without departing from the inventive concepts. For example, now that the advantage of utilizing the leads of the electronic light source with a coin cell battery and a compact tactile switch has been described, other component arrangements than those described can be substituted. It is also evident that equivalent structures and processes may be substituted for the various structures and processes described.

The invention claimed is:

1. An illumination apparatus for illuminating a person or object, said illumination apparatus comprising:
   a light emitting diode having a dielectric casing;
   a solid, flexible rod having an elongated length dimension terminated by a first end and a second end, said flexible rod being made of a material, said material having sufficient clarity and being sufficiently dispersive of light such that light entering one of said ends is transmitted along said elongated length dimension and radiates from said rod in substantially all directions along a substantial portion of said length of said rod;
   said first end of said rod embedded in said dielectric casing;
   an attachment mechanism connected to said rod for stably connecting said rod to said person or object; and
   an electronics container housing said light emitting diode, a battery, and switch, wherein said container includes an anchoring mechanism for anchoring said second end of said flexible rod to form a loop.

2. The apparatus according to claim 1 wherein said attaching mechanism is incorporated into said container.

3. The apparatus according to claim 1 wherein said anchoring mechanism comprises an end cap capping said second end and a slot in said container large enough to receive said rod but too small to pass said end cap.

4. The apparatus according to claim 1 and further comprising an end cap capping one end of said flexible rod.

5. The apparatus according to claim 1 wherein said material is a thermoplastic material.

6. An illumination apparatus comprising:
   a flexible, light transmitting rod having a first end;
   a light source located to illuminate said first end of said rod, said light source comprising: a light emitting diode (LED) comprising a semiconductor chip embedded in a dielectric casing, and a pair of electrical leads attached to said semiconductor chip; and a battery; wherein said electrical leads directly contact said battery;
   an electronics container for containing said light source, said container having a base and a cap for covering said base; and
   a cam element located on said cap such that said cam element presses one of said electrical leads into electrical contact with said battery when said cap is rotated with respect to said base.

* * * * *